(12) United States Patent
Karmhag et al.

(10) Patent No.: US 10,012,887 B2
(45) Date of Patent: Jul. 3, 2018

(54) ELECTROCHROMIC DEVICES AND MANUFACTURING METHODS THEREOF

(71) Applicant: CHROMOGENICS AB, Uppsala (SE)

(72) Inventors: Richard Karmhag, Uppsala (SE); Greger Gregard, Uppsala (SE); Roger Vogt, Uppsala (SE)

(73) Assignee: CHROMOGENICS AB, Uppsala (SE)

( * ) Notice: Subject to any disclaimer, the term of this patent is extended or adjusted under 35 U.S.C. 154(b) by 0 days.

(21) Appl. No.: 14/784,897

(22) PCT Filed: Apr. 14, 2014

(86) PCT No.: PCT/EP2014/057469
§ 371 (c)(1),
(2) Date: Oct. 15, 2015

(87) PCT Pub. No.: WO2014/170241
PCT Pub. Date: Oct. 23, 2014

(65) Prior Publication Data
US 2016/0085128 A1   Mar. 24, 2016

(30) Foreign Application Priority Data
Apr. 18, 2013   (SE) ...................... 1350488

(51) Int. Cl.
*G02F 1/15*   (2006.01)
*G02F 1/153*   (2006.01)
(Continued)

(52) U.S. Cl.
CPC .......... *G02F 1/1533* (2013.01); *B23K 26/351* (2015.10); *B26D 3/282* (2013.01);
(Continued)

(58) Field of Classification Search
CPC ............. G02F 1/1533; G02F 1/133305; G02F 2201/56; G02F 1/167; G02F 1/13452;
(Continued)

(56) References Cited

U.S. PATENT DOCUMENTS 4,636,037 A    1/1987  Thomke et al.
6,136,468 A *  10/2000 Mitchell, Jr. ........... G02F 1/153
                                                  429/110
(Continued)

FOREIGN PATENT DOCUMENTS

WO    2008/013501 A1    1/2008

*Primary Examiner* — Mahidere Sahle
(74) *Attorney, Agent, or Firm* — Porter Wright Morris & Arthur LLP (57) ABSTRACT

A method for enhancing the reliability of contacting the conductive layers in a laminated electrochromic device structure is disclosed (FIG. 7). The laminate structure (10), typically fabricated in the form of a sheet, comprises: two polymer substrates (21, 22); two conductive layers (31, 32)—one arranged on each substate—and facing each other; an electrochromic layer (41) and a counter-electrode layer (42) each arranged on different conductive layers; and an electrolyte layer (50) interposed between the electrochromic layer and the counter-electrode layer. Either an incision with an undulating cutting depth or perforations of predetermined sizes, depths (through at least most of one substrate) and separations are prefabricated along a desired tear line in the structure (step 220)—once the final shape of the device is defined—to facilitate the tearing away of the one polymer substrate to reveal the conductive layer to be contacted on the underlying substrate.

28 Claims, 9 Drawing Sheets

(51) Int. Cl.
*G02F 1/1333* (2006.01)
*B23K 26/351* (2014.01)
*B26D 3/28* (2006.01)
*B26F 1/18* (2006.01)
*G02F 1/1345* (2006.01)

(52) U.S. Cl.
CPC .......... *B26F 1/18* (2013.01); *G02F 1/133305* (2013.01); *G02F 1/13458* (2013.01); *G02F 2201/56* (2013.01)

(58) Field of Classification Search
CPC .......... G02F 1/13306; G02F 1/133351; G02F 1/13458; G02F 1/136286; G02F 1/1523; G02F 1/155; G02F 1/163; B32K 3/282; B26D 1/18
USPC .......................................................... 359/275
See application file for complete search history.

(56) References Cited

U.S. PATENT DOCUMENTS

| | | | |
|---|---|---|---|
| 7,872,791 B2* | 1/2011 | Karmhag | G02F 1/1533 359/265 |
| 8,018,644 B2* | 9/2011 | Gustavsson | G02F 1/163 359/296 |
| 2004/0045830 A1 | 3/2004 | Tseng et al. | |
| 2004/0233375 A1* | 11/2004 | Chung | G02F 1/1339 349/153 |
| 2005/0181533 A1* | 8/2005 | Kawase | H01L 27/283 438/82 |
| 2005/0236367 A1 | 10/2005 | Wang et al. | |
| 2006/0098289 A1* | 5/2006 | McCabe | B60R 1/12 359/603 |
| 2010/0165439 A1 | 7/2010 | Gaskell et al. | |
| 2010/0165440 A1* | 7/2010 | Nguyen | G02F 1/155 359/275 |
| 2012/0327499 A1 | 12/2012 | Parker et al. | |

* cited by examiner

ELECTROCHROMIC DEVICES AND MANUFACTURING METHODS THEREOF

TECHNICAL FIELD

The present invention relates in general to electrochromic devices and methods for manufacturing thereof.

BACKGROUND

Electrochromic devices are today used in widely different applications for enabling control of light transmission. Non-exclusive examples are helmet visors, windows on buildings or automotives, mirrors and goggles. One type of electrochromic devices needs electrical power or charges only during the transition between different transmittance states but keeps the transmittance if the electrical power is disconnected. Such a type is in the present disclosure referred to as a "non-self-erasing electrochromic device". In one example of such a non-self-erasing electrochromic device, a thin foil of stacked layers is used, incorporating conducting layers, electrochromic layers and an electrolyte layer. In this type of electrochromic device these layers may be provided between two substrate sheets or deposited onto one single substrate, serving as main structural bodies of the electrochromic device. In order to change the transmittance of the device, a voltage is provided between two electron conducting layers. The voltage causes a charging of the electrochromic device, which in turn results in a transmittance change. The level of transmittance is preserved when the voltage is removed. Polymer substrates are useful in many application, e.g. for providing a shape flexibility.

An important process step during manufacturing is the contacting of the electron conducting layers. Since the electrochromic device generally is very thin, so are the electron conducting layers. Contacting from the sides of the electrochromic device becomes practically impossible or at least very difficult to perform in a more or less automated manner. The typical approach for facilitating contacting is to let one substrate sheet with the associated electron conducting layer protrude outside the other substrate sheet. The other substrate sheet and the other electron conducting layer are typically protruding at another portion of the device. Contacting of the electron conducting layers can then be performed at these protruding portions.

In many manufacturing processes of electrochromic devices of today, the production of most of the electrochromic device is performed at the same location. If complex manufacturing processes are used, the production is typically limited to a few sites, which in turn leads to large volume transports of electrochromic devices. If manufacturing is supposed to take place closer to the final site of use or market and since high volume throughput is cost reducing, the manufacturing processes have to be kept simple and of low cost. In that view, it would be beneficial if the production could be divided into different stages. For instance, an electrochromic device sheet could be produced in one stage at a first location. The final assembly of the entire electrochromic device into the final object may then be performed at a later stage and perhaps also at another location. There are, however, several difficulties with such approaches. Since contacting most conveniently is performed in connection with the final assembly, semi-manufactured electrochromic devices with bare electron conducting layers have to be stored and/or transported. The risk for damages in the semi-manufactured electrochromic devices is thus large.

Also, in different applications, electrochromic devices of varying geometrical shapes may be needed. The final shape may even not be known until just before the actual assembly. In such cases, it can be difficult to provide semi-manufactured electrochromic devices with a correct shape in advance, and it would be beneficial if the final shape of the electrochromic device could be cut out from a larger sheet of an electrochromic layered structure. In such cases, the provision of protruding parts appropriate for contacting becomes even more difficult.

SUMMARY

It is an object of the present invention to provide electrochromic devices and electrochromic layered structures that enable a facilitated manufacturing, as well as to provide corresponding manufacturing methods. This object is achieved by electrochromic devices, electrochromic layered structures and manufacturing methods according to the enclosed independent patent claims. Preferred embodiments are defined by dependent claims. In general words, in a first aspect, a method for producing an electrochromic device comprises providing of an electrochromic layered structure. The electrochromic layered structure has a first substrate sheet, a second substrate sheet, said first substrate sheet and said second substrate sheet being polymer substrates, an electron conducting layer at least partially covering the first substrate sheet, a second electron conducting layer at least partially covering the second substrate sheet, a first electrochromic layer at least partially covering the first electron conducting layer, a counter electrode layer at least partially covering the second electron conducting layer, and an electrolyte layer laminated between and at least partially covering the first electrochromic layer and the counter electrode layer. A fracture indication is created along a line into the first substrate sheet or the second substrate sheet. At least a part of the fracture indication cuts through at least a major part of the first substrate sheet or the second substrate sheet, respectively.

In a second aspect, an electrochromic layered structure comprises a first substrate sheet, a second substrate sheet, said first substrate sheet and said second substrate sheet being polymer substrates, a first electron conducting layer at least partially covering the first substrate sheet, a second electron conducting layer at least partially covering the second substrate sheet, an electrochromic layer at least partially covering the first electron conducting layer, a counter electrode layer at least partially covering the second electron conducting layer and an electrolyte layer laminated between and at least partially covering the first electrochromic layer and the counter electrode layer. The electrochromic layered structure has a fracture indication along a line into the first substrate sheet or the second substrate sheet. At least a part of the fracture indication cuts through at least a major part of the first substrate sheet or the second substrate sheet, respectively.

In a third aspect, an electrochromic device comprises an electrochromic layered structure. The electrochromic layered structure has a first substrate sheet, a second substrate sheet, said first substrate sheet and said second substrate sheet being polymer substrates, a first electron conducting layer at least partially covering the first substrate sheet, a second electron conducting layer at least partially covering the second substrate sheet, an electrochromic layer at least partially covering the first electron conducting layer, a counter electrode layer at least partially covering the second electron conducting layer and an electrolyte layer laminated between and at least partially covering the first electrochromic layer and the counter electrode layer. At least one first electrode is attached to the first electron conducting layer and at least one second electrode is attached to the second electron conducting layer. The electrochromic layered structure has a first area in which the first substrate sheet is not covered by the second substrate sheet and/or a second area in which the second substrate sheet is not covered by the first substrate sheet. At least one of a first edge of the second substrate facing the first area and a second edge of the first substrate facing the second area is created by ripping off a first part of the second substrate or a second part of the first substrate, respectively, along a fracture indication.

One advantage with the electrochromic devices, electrochromic layered structures and manufacturing methods presented above is that it enables a flexible manufacturing and improves the possibilities for large-scale production.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

One approach to enable a cost-efficient large-scale production of electrochromic devices is to manufacture large sheets or rolls of electrochromic layered structures, based on polymer substrates. The electrochromic layered structures are at a later stage are cut into a final shape electrochromic device suitable for the end application. Such an approach makes it possible to transport or store electrochromic layered structures in an efficient way as well as enabling production of differently shaped electrochromic devices from one and the same basic front end process.

Figure 1A:
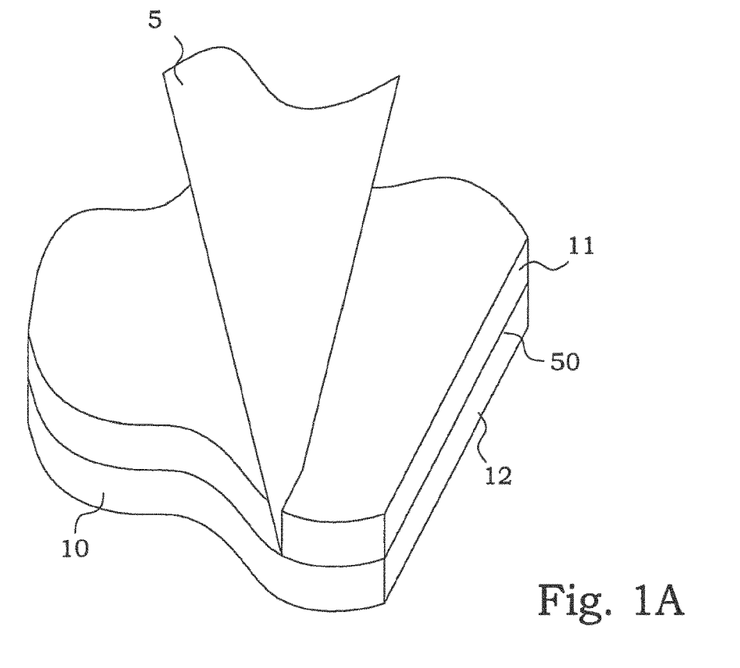
FIG. 1A is a schematic illustration of kiss cutting an electrochromic layered structure.
Figure 1B:
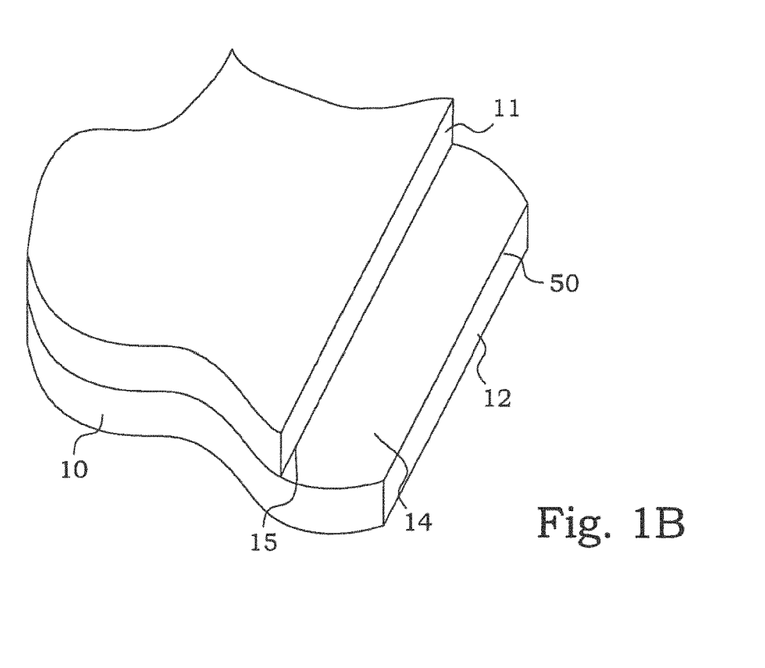
FIG. 1B is a schematic illustration of an electrochromic layered structure with a part of one half cell removed.
Figure 2A:
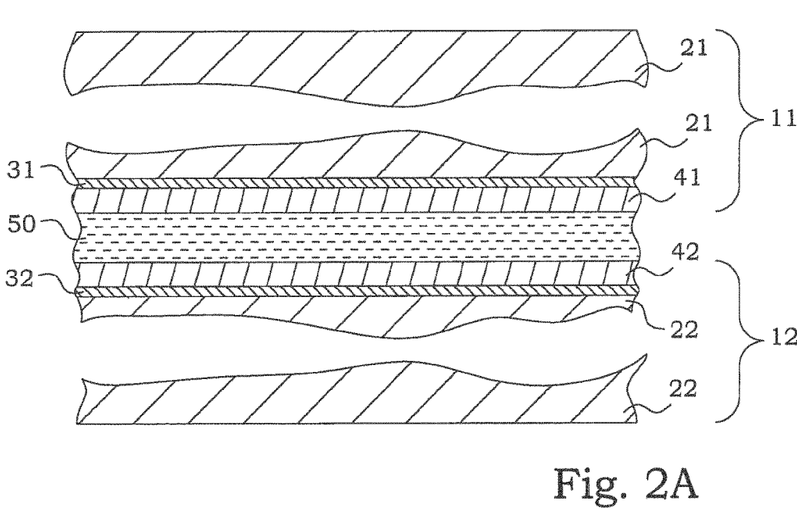
FIG. 2A is a schematic cross-sectional view of an embodiment of an electrochromic layered structure.

As mentioned above, a problem with such an approach is how to provide an efficient contacting. One approach to solve this problem is to try to remove a portion of the laminated electrochromic layered structure for exposing one of the electron conducting layers. This is schematically illustrated in FIGS. 1A-B. A laminated electrochromic layered structure 10 comprises an upper half-cell 11 and a lower half-cell 12, between which an electrolyte 50 is laminated. As schematically shown in FIG. 2A, each half-cell 11, 12 comprises a respective substrate sheet 21, 22, made of polymer, a respective electron conducting layer 31, 32, and an electrochromic layer or a counter electrode layer 41, 42. In other words, one half-cell, in FIG. 2A the upper half-cell 11, of the laminated electrochromic layered structure 10 comprises a first substrate sheet 21, made of polymer, a first electron conducting layer 31 at least partially covering the first substrate sheet 21, and a first electrochromic layer 41 at least partially covering the first electron conducting layer 31. The other half-cell, in FIG. 2A the lower half-cell 12, of the laminated electrochromic layered structure 10 comprises a second substrate sheet 22, made of polymer, a second electron conducting layer 32 at least partially covering the second substrate sheet 22, and a counter electrode layer 42 at least partially covering the second electron conducting layer 32. The electrolyte layer 50 is laminated between and at least partially covering the first electrochromic layer 41 and the counter electrode layer 42. In one embodiment, the counter electrode layer 42 may in itself also be an electrochromic layer.

A cutting equipment, schematically illustrated as an edge 5 in FIG. 1A, is used to create a continuous kiss cut or incision through the upper half-cell 11. The continuous kiss cut is ideally made through the upper half-cell 11 but does not extend into the lower half-cell 12. The portion of the upper half-cell 11 that was situated outside the cut was easily removed, since only the adhesive properties of the electrolyte kept it in place. The result is shown in FIG. 1B. Any remaining electrolyte below the removed portion was also cleaned off. Possibly, depending on the contacting method, the counter electrode layer of the lower half-cell was cleaned off as well. This exposes a surface 14 covered with the second electron conducting layer 32. Contacting can then be performed with the exposed second electron conducting layer 32.

The situation in FIGS. 1A-B is of course idealized. One problem is that the depth of the continuous kiss cutting ending exactly within the electrolyte has to be controlled within extremely tight tolerances. In a typical case, the substrate sheets may be 0.1-0.2 mm thick, whereas the electrochromic layer and counter electrode layer typically are some hundreds of nm thick, the electrolyte may be some tens of µm thick and the electron conducting layers may be 200 nm thick. It is therefore a very delicate problem to control the cutting in such a manner that the upper substrate sheet is completely penetrated but that the lower electron conducting layer is intact. Very stable cutting equipments are thus required.

Figure 2B:
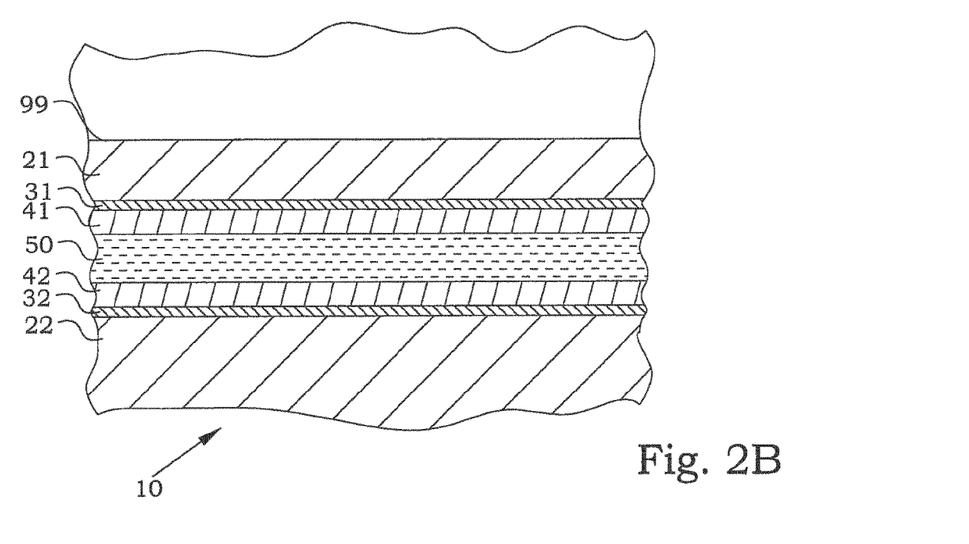
FIGS. 2B-E are schematic cross-sectional view of embodiments of fracture indications through an electrochromic layered structure.
Figure 2C:
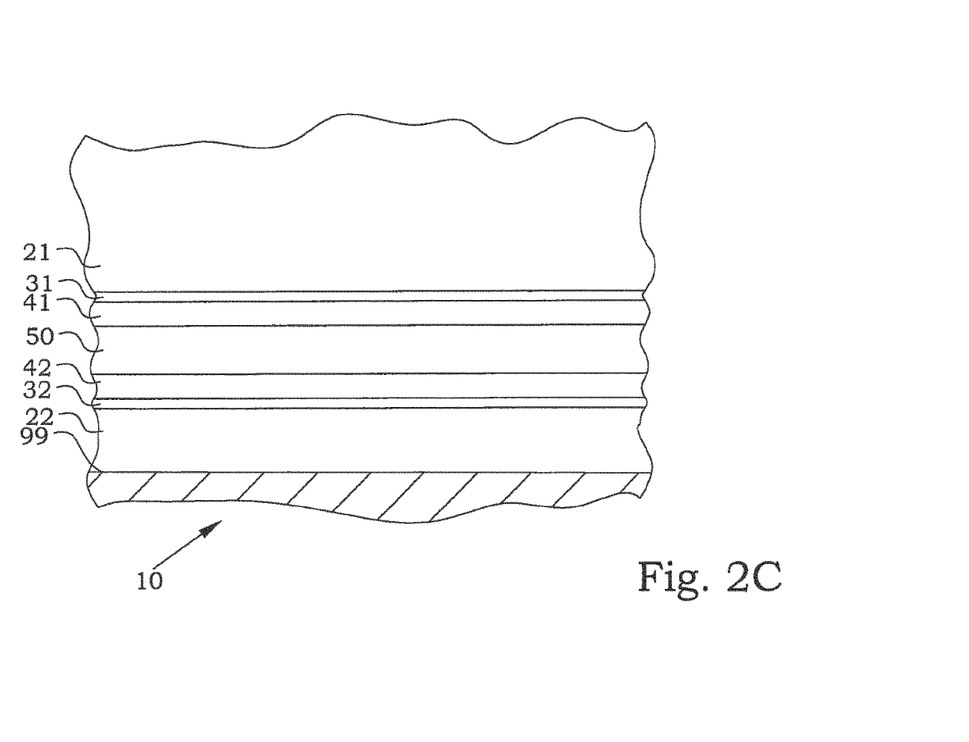

Different cutting methods have been investigated for this purpose, e.g. laser ablation and mechanical cutting. In a few cases, cutting accuracy that was satisfactory for ensuring an unaltered operation of the electrochromic device was obtained. However, in order to reduce production costs, simple cutting equipment may be selected to be used, which typically lowers the cutting accuracy. If the kiss cut 15 is too deep, breaking the electron conducting layer, the electrical connection is lost or at least severely deteriorated, which detrimentally influences the electrochromic properties of the final product. If the kiss cut 15 is too shallow, not penetrating the entire upper substrate sheet, there is a certain risk for bringing parts of the neighboring parts of the upper substrate sheet when a cut-out piece is to be removed. The substrate sheets are typically at least partially crystalline and tend therefore to flake off in directions transverse to the cut. The internal operation of the electrochromic device will be intact, however, the device will be impossible or at least difficult to provide with reliable contacts. These two alternatives are schematically illustrated in FIGS. 2B and 2C with the bottom of the kiss cut denoted as 99.

Figure 2D:
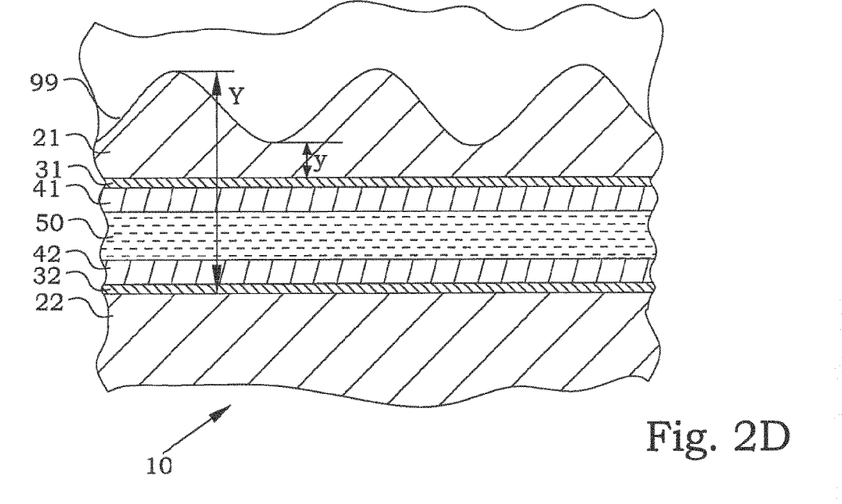

The possibilities for removing the cut-away half-cell without damaging the device can be improved by using an incision with an undulating cutting depth, as schematically indicated in FIG. 2D. A relatively large difference between the deep and shallow parts of this undulation and an adapting the kiss cutting so that the deep parts end relatively close to the inner surface of the cut substrate, as denoted by y in the figure, ensures that a distance Y between the most shallow parts of the incision and the inner surface of the opposite substrate becomes much larger than the width of the electron conducting layers, the electrolyte and the electrochromic layer/counter electrode layer together. A low value of y is requested, since that means that the remaining part of the substrate that has to be broken away is small. A relatively high value of Y is at the same time requested in order to have a margin for operational accuracy of the kiss cutting device.

Figure 2E:
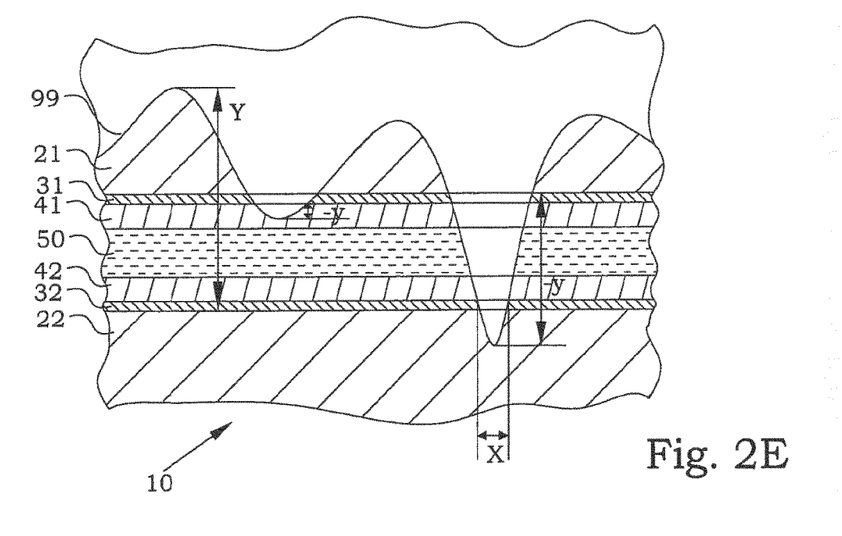

In FIG. 2E, a further example is given. Here the y value for the left deep incision part is negative, however to its absolute value smaller than the width of the electron conducting layers, the electrolyte and the electrochromic layer/counter electrode layer together. In other words, the inner surface of the upper substrate is penetrated, but the lower electron conducting layer is unharmed. This would be an ideal kiss cutting depth. In the right deep incision part, the absolute value of y is larger than the width of the electron conducting layers, the electrolyte and the electrochromic layer/counter electrode layer together, which means that the incision cuts through the electron conducting layer of the lower half-cell within the range denoted by X. In this region, the electron conducting properties are thus destroyed. However, outside the range X, the electron conducting layer is still unharmed and such parts are enough to take over the function of the destroyed range.

Pushing these ideas further, a non-continuous cutting or perforation cutting has been found also to be applicable. Ideally, at least for continuous non-undulating cutting, the kiss cut should not penetrate the electron conducting layer of the opposite side to the side on which the cutting is applied. However, if as illustrated above only a minor part of the electron conducting layer along the cut is destroyed, the remaining, major, part of the electron conducting layer is typically enough to provide sufficient electron conduction into the main area of the electrochromic layered structure. In other words, it is not devastating if the cut locally penetrates through the electron conducting layer, if there are unspoiled portions in the neighborhood.

Likewise, in non-undulating continuous cutting, it is preferred if the cut goes all the way through the first substrate sheet. However, for non-continuous cutting, it has been found that full penetration of the first substrate sheet is only requested at limited spots in order to have advantageous properties. It was therefore found that a line of spots where the substrate sheet was penetrated, i.e. a perforation, was enough to support a ripping off of the cut-off portion of the first substrate sheet.

Another advantage of utilizing a non-continuous cutting is that even if the cut is made, the risks for an accidental removal of the portion intended to be ripped off is low. This means that storage and transportation of sheets of electrochromic layered structures with non-continuous cuttings can be performed in a safer way. In this way, it becomes possible to choose the occasion of producing the cut, in connection with the original production of the electrochromic layered structures or in connection with the actual contacting process.

Figure 3:
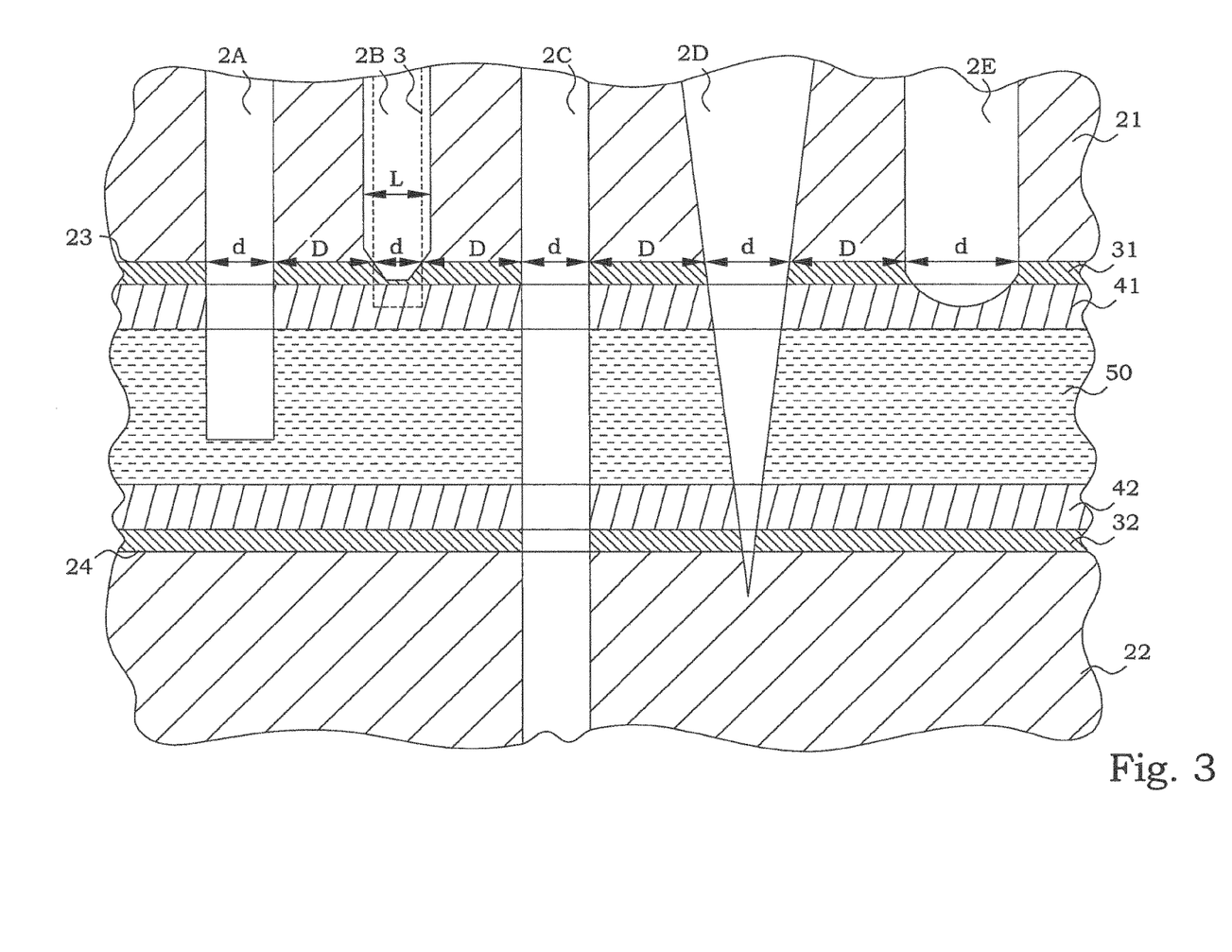
FIG. 3 illustrates schematically in a cross-sectional view different embodiments of holes through an electrochromic layered structure.

The size and distribution of the holes have influence on the removal properties. FIG. 3 illustrates cross-sections of some different, non-exclusive, possibilities for holes 2A-E in an electrochromic layered structure 10. Note that these illustrated situations are strongly idealized concerning e.g. geometry, smoothness etc. Hole 2A penetrates the entire upper half-cell 11 and a little bit into the electrolyte layer 50. The hole 2A has a diameter d at the first electron conducting layer 31. Hole 2B penetrates the first substrate sheet 21 and a little bit into the electron conducting layer 31. The bottom of the hole 2B has inclined portions, which gives the hole 2B smaller dimensions in the electron conducting layer 31 than generally in the first substrate sheet 21. The largest diameter through the first substrate sheet 21 is L, but the largest diameter in the first electron conducting layer 31 is d, which is somewhat smaller than L.

It has been found that one characteristic property of a non-continuous cut is the size of the hole at the interface between the first substrate sheet 21 and the first electron conducting layer 31 (and analogously between the second substrate sheet 22 and the second electron conducting layer 32 for holes provided from the opposite side). The substrate sheet 21 constitutes the main structural member of the upper half-cell 11, and if a part of the interface between the first substrate sheet 21 and the first electron conducting layer 31 is removed, the mechanical strength against ripping actions becomes reduced. The mechanical strengths of the first electron conducting layer 31 and the electrochromic layer 41 are not large enough to influence the overall mechanical strength in any significant way. One of the size quantities of the holes in the upper half-cell 11 that are used for defining particular embodiments of the present disclosure is thus the largest diameter of the hole at the interface between the first substrate sheet 21 and the first electron conducting layer 31, and analogously for holes through the lower half-cell 12, the largest diameter of the hole at the interface between the second substrate sheet 22 and the second electron conducting layer 32.

Returning to FIG. 3, it has been found that the impact of a hole 2B on the ripping properties is approximately the same as if the hole would have had the diameter d along its entire length, e.g. as indicated by the broken lines 3, at least if the holes are not merging. This is of course a simplification of the situation, but the largest diameter of the hole at the interface between the first substrate sheet 21 and the first electron conducting layer 31 is indeed an important measure. At the same time as the intention is to reduce the ripping resistance of the first substrate sheet 21, the hole size should be kept small in order to reduce the risk for a large impact on the operation of the laminated electrochromic layered structure 10 as a whole. It has been found that in preferred embodiments, holes in an interface 23 between the first substrate sheet 21 and the first electron conducting layer 31 or in an interface 24 between the second substrate sheet 22 and the second electron conducting layer 32, respectively, have a respective largest diameter that is less than 0.2 mm, more preferably less than 0.1 mm and most preferably less than 0.05 mm.

Hole 2C penetrates though the entire upper half-cell 11, the electrolyte as well as at least a part of the lower half-cell 12. In this particular embodiment, the hole 2C is a non-through hole, with respect to the entire electrochromic layered structure 10. This ensures that there will be no channels for air to the electrolyte, which may deteriorate with time if it is exposed for oxygen. The hole 2C in the present embodiment damages the counter electrode 42 and the second electron conducting layer 32. However, these damages are only local and undamaged parts of the lower half-cell 12 will anyway be operative to present sufficient charging properties. One may here easily understand that holes damaging the counter electrode 42 and the second electron conducting layer 32 should not be situated too close. Sufficient electron conductivity has to be present in a direction perpendicular to a line of holes.

Hole 2D is a hole with a diameter varying considerable over the length of the hole. Still, one important measure of the hole is the largest diameter d at the interface between the first substrate sheet 21 and the first electron conducting layer 31. Hole 2E is a hole with a rounded-off tip. Both the first substrate sheet 21 and the first electron conducting layer 31 are fully penetrated, and the tip of the hole 2E is situated in the electrochromic layer 41. The geometries of holes 2D and 2E are the holes among the examples in FIG. 3 that probably are most similar to real hole geometries.

In FIG. 3, a distance D denotes the distance between two adjacent holes, as measured at the interface between the first substrate sheet 21 and the first electron conducting layer 31. In order to provide an indication for how a ripping-off should be directed, the distance D should not be too large. It has been found that in preferred embodiments, two neighboring holes in the interface 23 between the first substrate sheet 21 and the first electron conducting layer 31 or in the interface 24 between the second substrate sheet 22 and the second electron conducting layer 32, respectively, are separated by less than 1 mm, more preferably by less than 0.5 mm and most preferably by less than 0.2 mm.

Figure 4A:
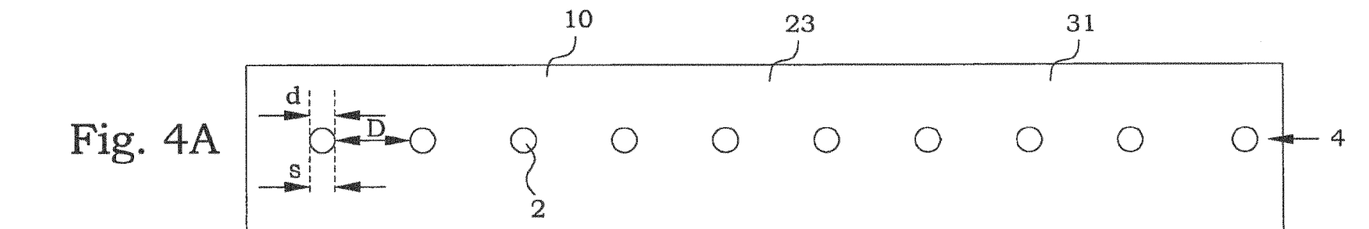
FIGS. 4A-D illustrate different embodiments of lines of holes through an interface between a substrate sheet and a electron conducting layer of an electrochromic layered structure.
Figures 4B, 4C:
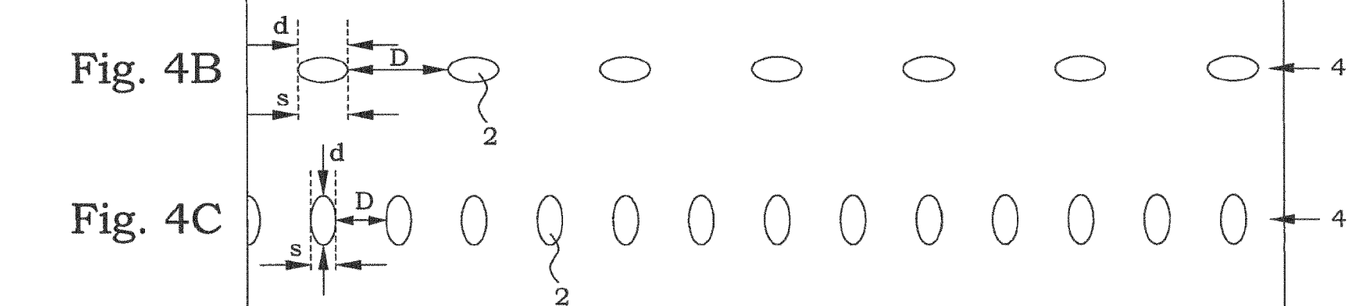

FIGS. 4A-D illustrates schematically, in a top view, embodiments of lines of holes in a laminated electrochromic layered structure 10 with the first substrate sheet removed. The illustrated hole dimensions and geometries thus corresponds to the dimensions and geometries at the interface 23 between the first substrate sheet 21 and the first electron conducting layer 31. In FIG. 4A, a line 4 of holes 2 is illustrated. Each hole 2 has a diameter d and the holes are separated by a distance D. The distance D is thus defined as the distance between the closest parts of the hole circumferences. In FIG. 4B, another line 4 of holes 2 is illustrated. Here, the geometry of the holes 2 is not circular. Instead, the holes have an elongated shape in the direction of the line 4. The diameter d is here the largest diameter of each hole 2, i.e. the diameter in the extension direction of the elongated shape, which in this embodiment is directed in the direction of the line 4. In FIG. 4C, another line 4 of holes 2 with elongated cross-section is illustrated. However, here the extension direction is transverse to the general direction of the line 4. The largest diameter d of the holes 2 is now the diameter perpendicular to the line 4.

Another measure that is possible to define is the hole diameter s in the direction of a neighbouring hole. This diameter measure s is in FIG. 4C smaller than the largest diameter d of the holes 2. In FIGS. 4A and 4B, however, these two measures, s and d, are the same. Another parameter that influences the ripping-off properties is the ratio between the hole diameter s in the direction of a neighbouring hole in the interface 23 between the first substrate sheet 21 and the first electron conducting layer 31 or analogously the interface between the second substrate sheet and the second electron conducting layer and the distance D between these neighbouring holes. It has been found that in preferred embodiments, this ratio s/D is larger than 0.1, preferably larger than 0.2 and most preferably larger than 0.4.

The tests were mainly performed with PolyEThylene (PET) substrates of 175 μm thickness. The absolute optimum conditions are dependent on the mechanical properties of the film material as well as on the thickness of the substrate sheet. A general trend is that a film of a tougher material, as well as a thicker film, will need more closely positioned holes to achieve the very best results. However, for polymer substrates presently being considered as suitable as substrate materials for electrochromic devices, e.g. PET, poly(ethylene naphtalate) (PEN) or polycarbonate (PC), the ripping properties are relatively similar. The dependency of the optimum conditions is therefore not extremely strong and the above presented preferred distances or ratios can therefore be used as approximate estimations also for such materials and for reasonable film thicknesses used for electrochromic applications.

Figure 4D:
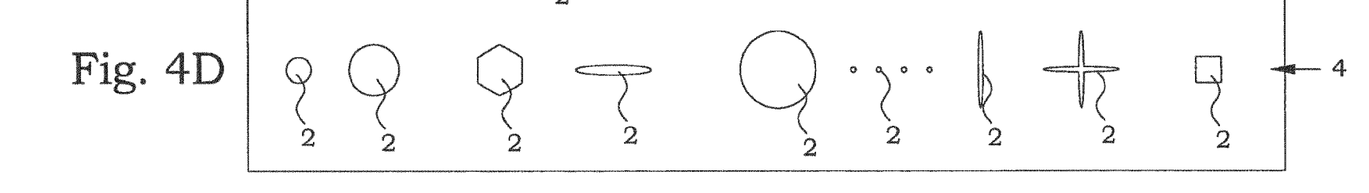

FIG. 4D illustrates another embodiment of a line 4 of holes 2. In this embodiment, the hole sizes s and d, the hole distances D and the hole geometries varies along the line 4. This embodiment is shown just to emphasize that it is not necessary to have identical holes in the lines. Different embodiments can have vastly different hole sizes s and d, hole distances D and hole geometries within one and the same line.

The electrochromic layered structure is as described above perforated by of a line of holes, in order to give a fracture indication for ripping off a part of one of the substrate sheets. In other words, the electrochromic layered structure has a fracture indication along a line. In one embodiment, the fracture indications are a perforation constituted by of a line of holes, where each of the holes penetrate the first substrate sheet, the first electron conducting layer and the first electrochromic layer or the second substrate sheet, the second electron conducting layer and the counter electrode layer. The opposite substrate sheet is typically and preferably provided with a similar fracture indication, however, at a different lateral position.

In an alternative embodiment, contacting of one of the electron conducting layers is provided by other means. It is then only necessary to provide a fracture indication in one of the substrates, to provide the opposite side contacting.

The perforation, i.e. the provision of the holes can be performed in different manners. The holes can in one embodiment be made by purely mechanical means, e.g. by pushing narrow needles through the substrate sheet. In other embodiments, techniques such as local heating can be used.

In a presently preferred embodiment, laser ablation is utilized. By moving a laser along the surface of the electrochromic layered structure and at the same time modulating the laser power, a perforation can be obtained. In test runs, the result is a continuous melted groove in the substrate sheet closest to the laser with varying width in the top layer. The groove is provided with penetrating holes down through the electron conducting layer separated by remaining substrate sheet material. Along the center line of the groove, there is remaining electrochromic layer material, remaining electron conducting layer material and remaining substrate sheet material at the positions of the power minima of the laser. However, these materials are gone at the power maxima, showing only remaining electrolyte or counter electrode material on top of the second electron conducting layer and the second substrate sheet. The so produced holes in the interface between the first substrate sheet and the first electron conducting layer have in the particular test runs an average length in the direction of the groove of about 120 µm. The distance between the holes in the interface between the first substrate sheet and the first electron conducting layer was in the particular test runs at an average about 250 µm.

Figure 5:
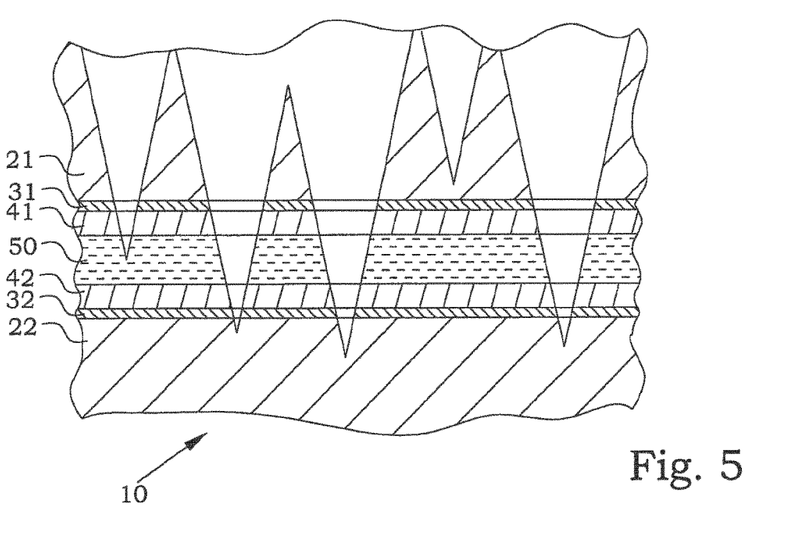
FIG. 5 illustrates schematically in a cross-sectional view an embodiment of a line of holes created by laser ablation.

A principal picture of the cross section of a perforation cut is seen in FIG. 5. The effect of the laser pulse distribution combined with the speed of the head is simplified here in the figure to result in basically triangular melt or ablation zones, as seen in the cross section. A more realistic situation typically involves more rounded-off main geometrical structures combined with a more rough detailed structure. This situation thus resembles a continuous undulating kiss cut. The result could also be considered as a combination of an incision and perforation. However, the simplified situation depicted in the figure is sufficient as illustration for the present discussion. An optimal setting of the laser is to cut through the top substrate layer with no damages in the underlying metal oxide layers, such as in the hole at the very left in the figure. However, even if the operation of the pulsed laser is perfectly stable and repeatable, the probability to have a fully undamaged lower half cell is small, for example considering variations in laser table or device thickness or properties. In the hole at the very right end of FIG. 5, the hole penetrates in to the lower half cell. However, undamaged electron conducting layer portions are still present. The neighboring hole does instead not reach the entire way down to the electrolyte, which means that a thin bridge of material from the first substrate sheet remains. Such a remaining bridge is typically very narrow and if not all or a significant part of the holes are of such a type, the ripping off action will be possible to perform anyway.

Figure 6:
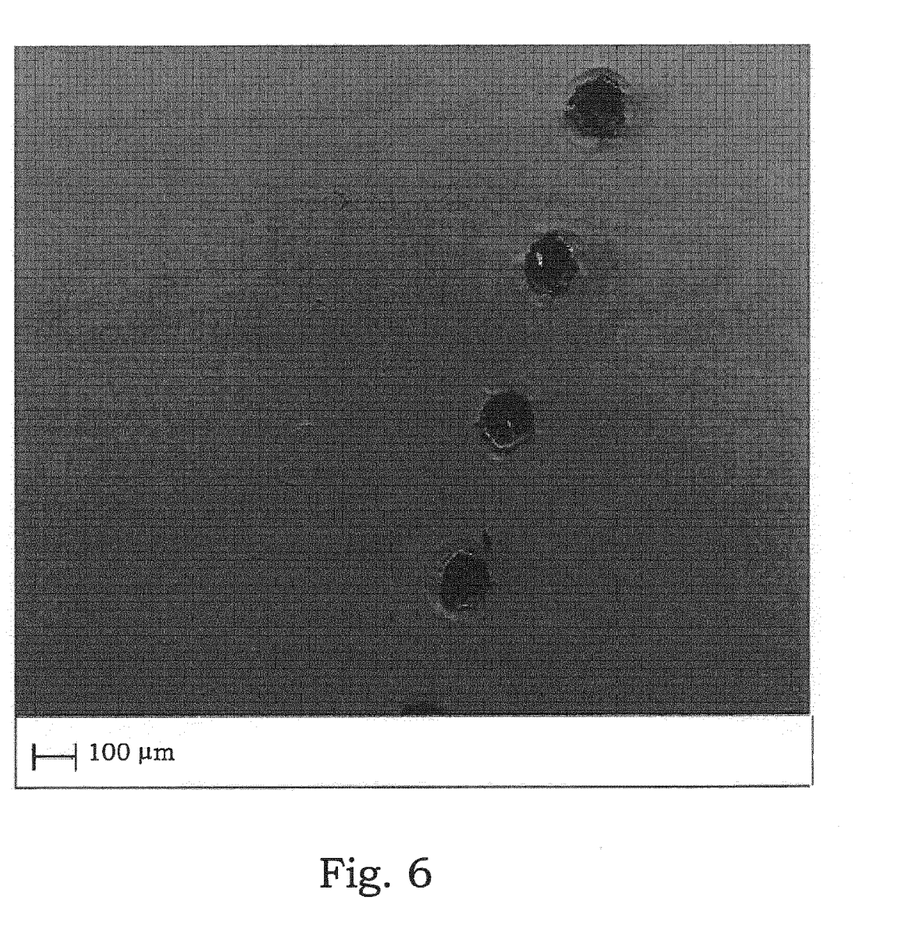
FIG. 6 is a scanning electron microscope image of a counter electrode surface after exposure to laser ablation.

In FIG. 6, a Scanning Electron Microscope (SEM) image is shown. The object is a counter electrode surface, in this case a WO layer provided on top of an Indium-Tin-Oxide (ITO) layer on a PET substrate. This surface is obtained by perforating an electrochromic layered structure by pulsed laser ablation followed by a total removal of the upper half-cell and the electrolyte. From the SEM image it is possible to conclude that the holes caused by the pulsed laser ablation indeed penetrated into the WO layer and the underlying ITO layer. However, it is also clearly seen that there are undamaged areas in-between, which would be able to handle conduction of electron in a satisfactory manner.

Figure 7:
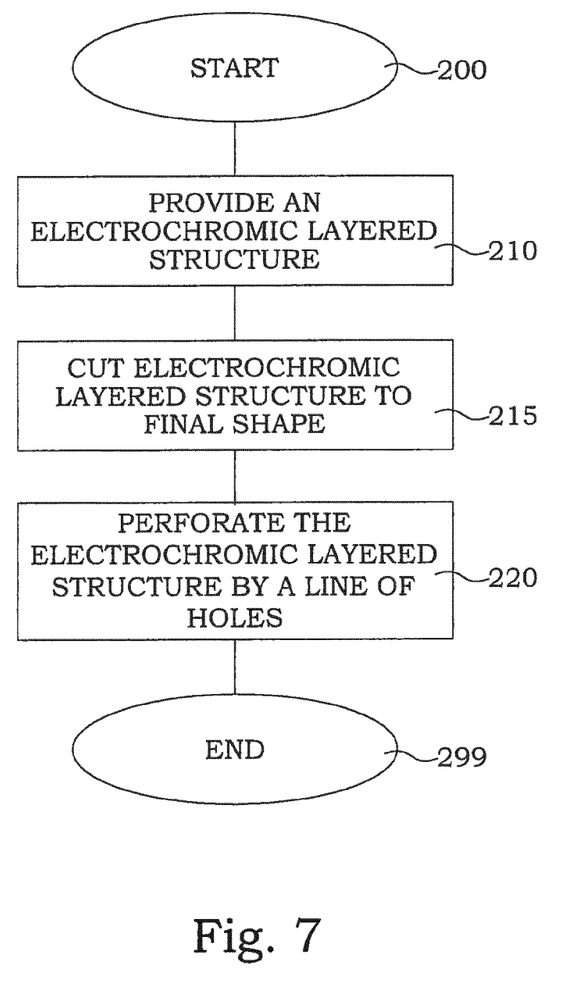
FIG. 7 is a flow diagram of steps of an embodiment of a method for producing an electrochromic device.

FIG. 7 is a flow diagram of steps of an embodiment of a method for producing an electrochromic device. The procedure starts in step 200. In step 210, an electrochromic layered structure is provided. The electrochromic layered structure has a first substrate sheet, a second substrate sheet, an electron conducting layer at least partially covering the first substrate sheet, a second electron conducting layer at least partially covering the second substrate sheet, a first electrochromic layer at least partially covering the first electron conducting layer, a counter electrode layer at least partially covering the second electron conducting layer, and an electrolyte layer laminated between and at least partially covering the first electrochromic layer and the counter electrode layer. Examples of how to produce such an electrochromic layered structure are well known as such in prior art. Examples of similar basic electrochromic layered structures can be found in e.g. U.S. Pat. No. 8,018,644, U.S. Pat. No. 7,872,791, U.S. Pat. No. 7,808,692 and U.S. Pat. No. 7,952,785. The details of the provision of the electrochromic layered structure are therefore known as such by the person skilled in the art and thus not further discussed.

For instance in the case the manufacturer of the electrochromic layered structure is not aware of the final size and shape of the intended electrochromic devices, the electrochromic layered structure may be provided in rolls or large sheets. In such cases, a preferred embodiment also comprises a step 215, in which the electrochromic layered structure is cut into a shape and size of an intended final electrochromic device. Since sheet rolls or piles of large sheets often are easier to handle, e.g. during transportation, such an approach may also be beneficial also in cases where the final shape in well know in advance.

In any case, in step 220, fracture indications are created in the electrochromic layered structure along a line into one of the first substrate sheet and the second substrate sheet. At least a part of the fracture indications cut through at least a major part of the first substrate sheet or the second substrate sheet, respectively. In one embodiment, the creation of fracture indications comprises forming at least one incision, cutting through at least a major part of the first substrate sheet or the second substrate sheet, respectively. In a further embodiment the forming of the at least one incision comprises forming of at least one incision having an undulating cutting depth along said line. In another embodiment, the step of creating fracture indications comprises perforating the first substrate sheet or the second substrate sheet by of a series of holes along the line. The holes preferably penetrates the first substrate sheet, the first electron conducting layer and the first electrochromic layer, or the second substrate sheet, the second electron conducting layer and the counter electrode layer. The procedure ends in step 299.

As briefly mentioned above, the use of a perforation for enabling ripping off a cell half to expose the inner surface of the other cell half also enables a flexible manufacturing. The perforation can e.g. in one embodiment be performed in connection with the lamination process. A perforated electrochromic layered structure can thereby be provided as a semi-manufactured article, which may be sold, stored, transported etc. The perforation can in other embodiments be performed in connection with the actual contacting. An integral electrochromic layered structure can thereby be perforated soon before the contacting is performed. A perforated electrochromic layered structure is thereby provided as an intermediate temporary article. In a final electrochromic device, the electrochromic layered structure presents portions, where one half cell is ripped off, of the half cells that are not covered with the other half cells. These portions are preferably used as contacting spots.

Figure 8A:
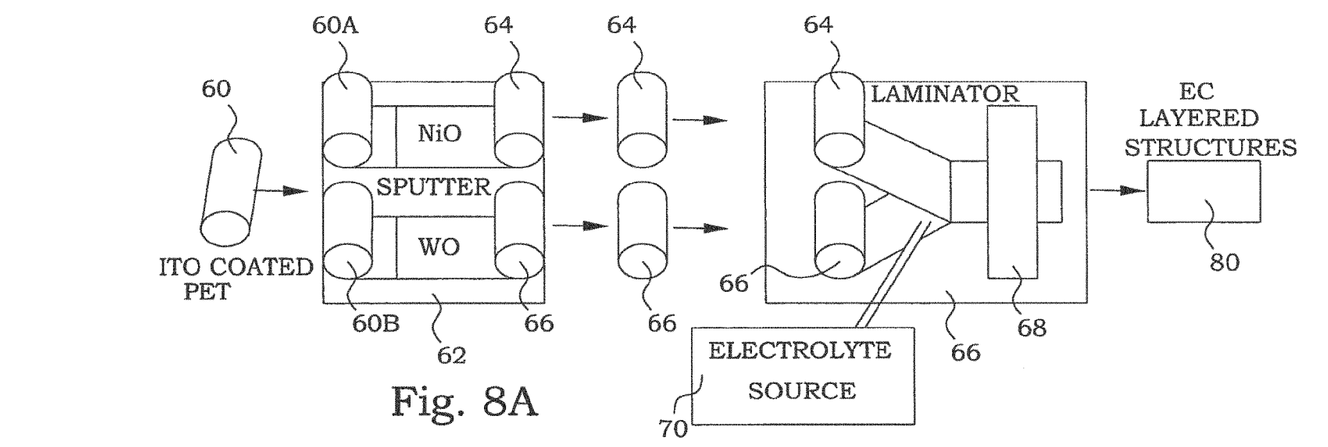
FIG. 8A is a schematic illustration of an embodiment of a front end production flow for production of electrochromic layers structures.

FIG. 8A illustrates schematically one embodiment of a front end production flow for production of electrochromic layered structures for use in electrochromic devices. ITO coated PET are provided in rolls 60. The ITO provides an electron conducting layer on the PET substrate sheet. The ITO of one roll 60A is moved through a sputter equipment 62, arranged for sputtering a layer of electrochromic NiO, to be used as counter electrode, on the ITO in a continuous sputtering process. The ITO of another roll 60B is moved through the sputter equipment 62, now arranged for sputtering a layer of electrochromic WO on the ITO in a continuous sputtering process. These two sputtering processes can also be performed simultaneously in two parallel process lines. Two rolls 64, 66 of covered ITO on PET are thus produced, each one suitable as a half cell in an electrochromic layered structure. The rolls 64, 66 are provided to a laminator 68. Electrolyte is provided from an electrolyte source 70 into the space between the coated PET substrates and the coated PET substrates and electrolyte are laminated together creating an electrochromic layered structure 80. The lamination can also be followed by a post-treatment in a post-treatment equipment 72, providing e.g. structural supporting features, curing and/or sealing.

Figure 8B:
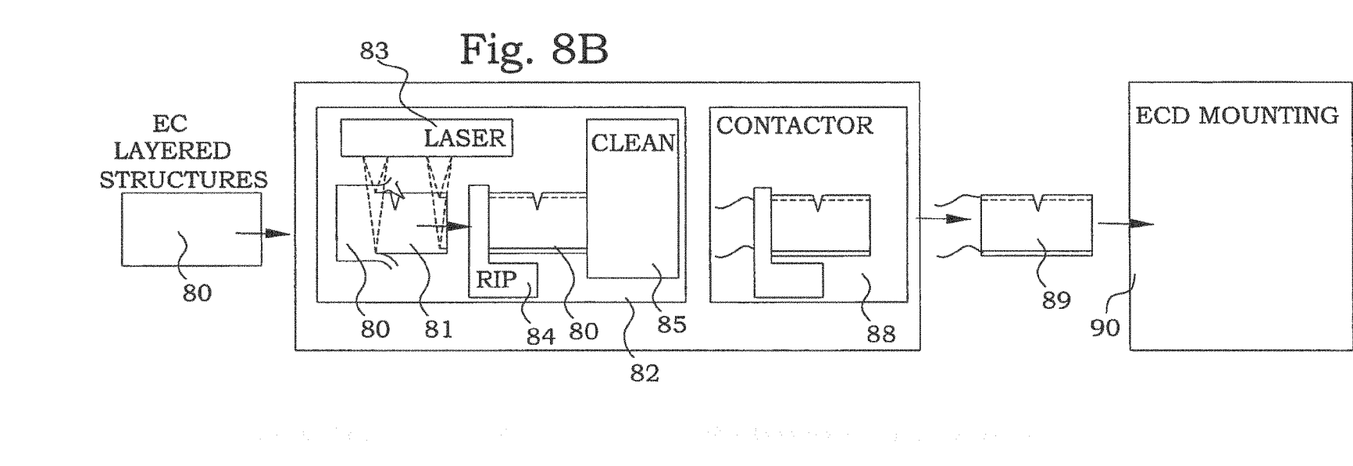
FIG. 8B is a schematic illustration of an embodiment of a back end production flow for production of electrochromic layers structures.

FIG. 8B illustrates schematically one embodiment of a back end production flow for production of electrochromic layered structures for use in electrochromic devices. The back end production flow can in one embodiment be provided in connection with the front end production flow. In another embodiment, the two flows are geographically separated into two different locations and the integral electrochromic layered structure is transported there between. In the back end production flow the laminated electrochromic layered structure 80 is provided to a cutter 82. The cutter 82 comprises a laser equipment 83 arranged for cutting out pieces 81 from the electrochromic layered structure adapted for the final application. The laser equipment 83 is furthermore arranged for a "kiss-cut" operation providing a incision or perforation of the laminated electrochromic layered structure 80 as basically described above. In one embodiment, the laser equipment comprises only one set-up, which used with a high power and a continuous steady power operates for cutting out the pieces, and which used with a lower varying power and or higher varying speed operates for providing the incision or perforation. The cutter 82 further comprises a ripping mechanism 84, attachable to the portions of the respective half cells that are separated from the main electrochromic layered structure 80 by the laser ablation. The ripping mechanism 84 is further arranged for ripping off portion to which it has attached. The kiss-cut operation and the ripping operation are typically performed on both sides of the cut-out electrochromic layered structure in order to provide contacting areas for both half cells. Typically, such kiss-cuts are provided at opposite edges of the cut-out electrochromic layered structure. The portion having the lower half-cell ripped off is illustrated by broken lines in the figure. The cutter 82 also comprises a cleaner 85, removing any remaining substances that ideally should have followed the ripped off half cell as well as remaining electrolyte. The bare inner surface of the remaining half cell is therefore exposed.

The electrochromic layered structure leaving the cutter 82 thus has a first area in which the first substrate sheet is not covered by the second substrate sheet, and a second area in which the second substrate sheet is not covered by the first substrate sheet. This means that a first edge of the second substrate facing the first area and a second edge of the first substrate facing the second area is created by ripping off a first part of the second substrate or a second part of the first substrate, respectively, along fracture indications, such as a perforation constituted by of a line of holes.

The electrochromic layered structure leaving the cutter 82 is in the embodiment of FIG. 8B entered into a contactor 88, in which for example a conducting tape is soldered to or electrically attached in any other ways to the conducting layers of the respective remaining half cells. In other words, at least one first electrode is attached to the first electron conducting layer and at least one second electrode is attached to the second electron conducting layer. The electrochromic layered structure with attached electrodes or contacts 89 is provided to an ECD mounting section 90 in which the electrochromic layered structure is mounted into a final electrochromic device. The electrochromic device thereby comprises an electrochromic layered structure according to the above described principles, but with an upper half cell ripped off in one lateral portion and with a lower half cell ripped off in another lateral portion.

An embodiment of a manufacturing method for an electrochromic device therefore, besides the earlier described steps for providing the perforated electrochromic layered structure, also comprises the action of ripping off a part of the first substrate sheet, the first electron conducting layer and the first electrochromic layer, and/or ripping off the second substrate sheet, the second electron conducting layer and the counter electrode layer, along the line of holes. Such an approach utilizing the creation and use of fracture indications on the electrochromic layered structure opens up for allowing transportation of large quantities of generic electrochromic layered structure sheet rolls or in generic electrochromic layered structure sheet stacks. The generic electrochromic layered structure can upon mounting in a final electrochromic device be cut into the intended shape and contacted in connection with the final assembly. A kind of "free form" manufacturing approach can thereby be applied.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for producing an electrochromic device, comprising the steps of:

providing an electrochromic layered structure having a first substrate sheet, a second substrate sheet, said first substrate sheet and said second substrate sheet being polymer substrates, a first electron conducting layer at least partially covering said first substrate sheet, a second electron conducting layer at least partially covering said second substrate sheet, a first electrochromic layer at least partially covering said first electron conducting layer, a counter electrode layer at least partially covering said second electron conducting layer, and an electrolyte layer laminated between and at least partially covering said first electrochromic layer and said counter electrode layer; and creating fracture indications along a line into one of said first substrate sheet and said second substrate sheet, wherein at least a part of said fracture indications cut through at least a major part of said first substrate sheet or said second substrate sheet, respectively, and through at least a part of the first electron conducting layer or the second electron conducting layer, respectively, said line of fracture indications enabling removal of a part of said first substrate sheet or said second substrate sheet by ripping said first substrate sheet or said second substrate sheet along the line of fracture indications, thereby exposing at least a part of a half cell having said second electron conducting layer or said first electron conducting layer, respectively, which provides electron conduction into an area of said electrochromic layered structure having both said first substrate sheet and said second substrate sheet.

2. The method according to claim 1, wherein said step of creating fracture indications comprises forming at least one incision, cutting through at least a major part of said first substrate sheet or said second substrate sheet, respectively.

3. The method according to claim 2 wherein said forming at least one incision comprises forming of at least one incision having an undulating cutting depth along said line.

4. The method according to claim 1, wherein said step of creating fracture indications comprises perforating said first substrate sheet or said second substrate sheet by of a series of holes along said line.

5. The method according to claim 4, wherein
said perforating is performed causing said holes to penetrate one of:
said first substrate sheet, said first electron conducting layer and said first electrochromic layer; and
said second substrate sheet, said second electron conducting layer and said counter electrode layer.

6. The method according to claim 5, wherein said holes are non-through holes with respect to said electrochromic layered structure.

7. The method according to claim 5, wherein said holes have a respective largest diameter in an interface between said first electron conducting layer and said first substrate sheet or in an interface between said second electron conducting layer and said second substrate sheet, respectively, that is less than 0.2 mm.

8. The method according to claim 5, wherein two neighboring ones of said holes are separated in an interface between said first electron conducting layer and said first substrate sheet or in an interface between said second electron conducting layer and said second substrate sheet, respectively, by less than less than 1 mm.

9. The method according to claim 5, wherein a ratio, between a respective diameter in an interface between said first electron conducting layer and said first substrate sheet or in an interface between said second electron conducting layer and said second substrate sheet, respectively, of said hole in a direction of a neighboring hole and a distance in said interface between said first electron conducting layer and said first substrate sheet or in said interface between said second electron conducting layer and said second substrate sheet, respectively, separating said hole and said neighboring hole, is larger than 0.1.

10. The method according to claim 1, wherein said fracture indications are created by laser ablation.

11. The method according to claim 1, further comprising the step of:
ripping off a part of said one of:
said first substrate sheet; and
said second substrate sheet,
along said line of said fracture indications.

12. An electrochromic layered structure, comprising:
a first substrate sheet;
a second substrate sheet;
said first substrate sheet and said second substrate sheet being polymer substrates;
a first electron conducting layer at least partially covering said first substrate sheet;
a second electron conducting layer at least partially covering said second substrate sheet;
an electrochromic layer at least partially covering said first electron conducting layer;
a counter electrode layer at least partially covering said second electron conducting layer; and
an electrolyte layer laminated between and at least partially covering said first electrochromic layer and said counter electrode layer,
said electrochromic layered structure having fracture indications along a line into one of said first substrate sheet and said second substrate sheet wherein at least a part of said fracture indications cut through at least a major part of said first substrate sheet or said second substrate sheet, respectively, and through at least a part of the first electron conducting layer or the second electron conducting layer, respectively, said line of fracture indications enabling removal of a part of said first substrate sheet or said second substrate sheet by ripping said first substrate sheet or said second substrate sheet along the line of fracture indications, thereby exposing at least a part of a half cell having said second electron conducting layer or said first electron conducting layer, respectively, which provides electron conduction into an area of said electrochromic layered structure having both said first substrate sheet and said second substrate sheet.

13. The electrochromic layered structure according to claim 12, wherein said fracture indications comprise at least one incision, cutting through at least a major part of said first substrate sheet or said second substrate sheet, respectively.

14. The electrochromic layered structure according to claim 13, wherein said at least one incision has an undulating cutting depth along said line.

15. The electrochromic layered structure according to claim 12, wherein said fracture indications comprise a perforation in said first substrate sheet or said second substrate sheet constituted by of a series of holes along said line.

16. The electrochromic layered structure according to claim 15, wherein said holes penetrate at least one of:
said first substrate sheet, said first electron conducting layer and said first electrochromic layer; and
said second substrate sheet, said second electron conducting layer and said counter electrode layer.

17. The electrochromic layered structure according to claim 16, wherein said holes are non-through holes with respect to said electrochromic layered structure.

18. The electrochromic layered structure according to claim 16, wherein said holes have a respective largest diameter in an interface between said first electron conducting layer and said first substrate sheet or in an interface between said second electron conducting layer and said second substrate sheet that is less than 0.2 mm.

19. The electrochromic layered structure according to claim 16, wherein two neighboring ones of said holes are separated in an interface between said first electron conducting layer and said first substrate sheet or in an interface between said second electron conducting layer and said second substrate sheet, respectively, by less than less than 1 mm.

20. The electrochromic layered structure according to claim 16, wherein a ratio between a respective diameter in an interface between said first electron conducting layer and said first substrate sheet or in an interface between said second electron conducting layer and said second substrate sheet, respectively, of said hole in a direction of a neighboring hole and a distance in said interface between said first electron conducting layer and said first substrate sheet or in said interface between said second electron conducting layer and said second substrate sheet, respectively, separating two neighboring ones of said holes is larger than 0.1.

21. The electrochromic layered structure according to claim 16, wherein said holes have a respective largest diameter in an interface between said first electron conducting layer and said first substrate sheet or in an interface between said second electron conducting layer and said second substrate sheet, respectively, that is less than 0.1 mm.

22. The electrochromic layered structure according to claim 16, wherein said holes have a respective largest diameter in an interface between said first electron conducting layer and said first substrate sheet or in an interface between said second electron conducting layer and said second substrate sheet, respectively, that is less than 0.05 mm.

23. The electrochromic layered structure according to claim 16, wherein two neighboring ones of said holes are separated in an interface between said first electron conducting layer and said first substrate sheet or in an interface between said second electron conducting layer and said second substrate sheet, respectively, by less than less than 0.5 mm.

24. The electrochromic layered structure according to claim 16, wherein two neighboring ones of said holes are separated in an interface between said first electron conducting layer and said first substrate sheet or in an interface between said second electron conducting layer and said second substrate sheet, respectively, by less than less than 0.2 mm.

25. The electrochromic layered structure according to claim 16, wherein a ratio between a respective diameter in an interface between said first electron conducting layer and said first substrate sheet or in an interface between said second electron conducting layer and said second substrate sheet, respectively, of said hole in a direction of a neighboring hole and a distance in said interface between said first electron conducting layer and said first substrate sheet or in said interface between said second electron conducting layer and said second substrate sheet, respectively, separating two neighboring ones of said holes is larger than 0.2.

26. The electrochromic layered structure according to claim 16, wherein a ratio between a respective diameter in an interface between said first electron conducting layer and said first substrate sheet or in an interface between said second electron conducting layer and said second substrate sheet, respectively, of said hole in a direction of a neighboring hole and a distance in said interface between said first electron conducting layer and said first substrate sheet or in said interface between said second electron conducting layer and said second substrate sheet, respectively, separating two neighboring ones of said holes is larger than 0.4.

27. A method for producing an electrochromic device, comprising the steps of:
providing an electrochromic layered structure having a first substrate sheet, a second substrate sheet, said first substrate sheet and said second substrate sheet being polymer substrates, a first electron conducting layer at least partially covering said first substrate sheet, a second electron conducting layer at least partially covering said second substrate sheet, a first electrochromic layer at least partially covering said first electron conducting layer, a counter electrode layer at least partially covering said second electron conducting layer, and an electrolyte layer laminated between and at least partially covering said first electrochromic layer and said counter electrode layer; and
creating fracture indications along a line into one of said first substrate sheet and said second substrate sheet, wherein at least a part of said fracture indications cut through at least a major part of said first substrate sheet or said second substrate sheet, respectively, where the first electron conducting layer or the second electron conducting layer covers the first substrate sheet or the second substrate sheet, respectively, said line of fracture indications enabling removal of a part of said first substrate sheet or said second substrate sheet by ripping said first substrate sheet or said second substrate sheet along the line of fracture indications, thereby exposing at least a part of a half cell having said second electron conducting layer or said first electron conducting layer, respectively, which provides electron conduction into an area of said electrochromic layered structure having both said first substrate sheet and said second substrate sheet.

28. An electrochromic layered structure, comprising:
a first substrate sheet;
a second substrate sheet;
said first substrate sheet and said second substrate sheet being polymer substrates;
a first electron conducting layer at least partially covering said first substrate sheet;
a second electron conducting layer at least partially covering said second substrate sheet;
an electrochromic layer at least partially covering said first electron conducting layer;
a counter electrode layer at least partially covering said second electron conducting layer; and
an electrolyte layer laminated between and at least partially covering said first electrochromic layer and said counter electrode layer,
said electrochromic layered structure having fracture indications along a line into one of said first substrate sheet and said second substrate sheet, wherein at least a part of said fracture indications cut through at least a major part of said first substrate sheet or said second substrate sheet, respectively, where the first electron conducting layer or the second electron conducting layer covers the first substrate sheet or the second substrate sheet, respectively, said line of fracture indications enabling removal of a part of said first substrate sheet or said second substrate sheet by ripping said first substrate sheet or said second substrate sheet along the line of fracture indications, thereby exposing at least a part of a half cell having said second electron conducting layer or said first electron conducting layer, respectively, which provides electron conduction into an area of said electrochromic layered structure having both said first substrate sheet and said second substrate sheet.

* * * * *

UNITED STATES PATENT AND TRADEMARK OFFICE
CERTIFICATE OF CORRECTION

PATENT NO. : 10,012,887 B2
APPLICATION NO. : 14/784897
DATED : July 3, 2018
INVENTOR(S) : Richard Karmhag et al.

It is certified that error appears in the above-identified patent and that said Letters Patent is hereby corrected as shown below:

On the Title Page

Item "(30) Foreign Application Priority Data", change "1350488" to --1350488-1--.

Signed and Sealed this
Eighteenth Day of September, 2018

Andrei Iancu
*Director of the United States Patent and Trademark Office*